United States Patent [19]

Wahl et al.

[11] Patent Number: 4,885,205

[45] Date of Patent: Dec. 5, 1989

[54] GLASS-MAT-REINFORCED THERMOPLASTIC PANELS

[75] Inventors: Ludwig Wahl, Schifferstadt; Helmut Vogel, Bramsche, both of Fed. Rep. of Germany

[73] Assignee: BASF Aktiengesellschaft, Ludwigshafen, Fed. Rep. of Germany

[21] Appl. No.: 281,853

[22] Filed: Dec. 9, 1988

[30] Foreign Application Priority Data

Dec. 9, 1987 [DE] Fed. Rep. of Germany ....... 3741667

[51] Int. Cl.$^4$ .............................................. B32B 15/00
[52] U.S. Cl. .................................... 428/285; 156/148; 428/280; 428/284; 428/290; 428/300
[58] Field of Search ............... 428/280, 285, 290, 300, 428/284; 156/148

[56] References Cited

U.S. PATENT DOCUMENTS

| | | | |
|---|---|---|---|
| 2,794,238 | 6/1957 | Dildilian et al. | 428/300 |
| 2,794,759 | 6/1957 | Dildilian et al. | 428/300 |
| 4,277,531 | 6/1981 | Picone | 428/300 |
| 4,335,176 | 6/1982 | Baumann | 428/300 |

*Primary Examiner*—James J. Bell
*Attorney, Agent, or Firm*—Oblon, Spivak, McClelland, Maier & Neustadt

[57] ABSTRACT

Semifinished material consisting of symmetrically-needled glass-fiber mat impregnated with a thermoplastic polymer. The glass mat can be made by, for instance, needling continuous filament web from above and below at the same time with a double needling machine.

10 Claims, No Drawings

GLASS-MAT-REINFORCED THERMOPLASTIC PANELS

The present invention relates to fiber-reinforced thermoformable semifinished material with improved flow when press molded consisting of a thermoplastic polymer and at least one layer of needled glass-fiber mat.

Glass-mat-reinforced thermoplastics (GMT) are being used increasingly for the manufacture of moldings, particularly of moldings used in automotive construction. The molding is carried out in a press at a temperature above the softening temperature of the thermoplastic. If the molding is at all complicated, for instance, if it has ribs, deep indentations, or steep sides, the material as a whole must be capable of flow, that is to say, the glass-fiber mat must be extensible enough to ensure that the features mentioned are reinforced by fibers.

GMT capable of flow is obtained if needled glass-fiber mat such as that described in, for instance, DE-A-31 12 496 (U.S. Pat. No. 4,335,176) is used. Needling has two effects on the mat, which generally consists of continuous or chopped-strand glass fibers crossing at random. In the first place it fixes the mat, that is to say it imparts cohesion and sufficient strength to allow handling and processing. In the second place it makes the mat more open, and it makes it extensible enough for molding by controlled rupture of glass fibers.

The needling process causes individual fiber ends to be thrust down at right angles to the plane of the mat by barbs on the needles. Increasing the number of penetrations per unit area and the coarseness of the barbs increases the number of fibers whose orientation is changed and the number that are ruptured, and thus affects the strength and extensibility of the mat. The use of needles with barbs pointing upwards, that is to say, with reversed barbs, as described in DE-A-30 29 442 (U.S. Pat. No. 4,277,531), has similar effects, except that the fiber ends are drawn upwards out of the mat.

Whichever way the barbs point, needled mat is formed with two different surfaces, one comparatively smooth, the other having a multitude of protruding fiber ends or spikes.

It is necessary that the needles should completely penetrate the mat and protrude several millimeters on the other side (the underside), especially when GMT is produced as described in DE-A-31 12 196, so that sufficient fibers are ruptured all through the mat. The result is that the underside has many spikes and that these are comparatively long (cf. the illustrations in DE-A-31 12 496). This leads to problems when the thermoplastic panel is processed. When the panel is manufactured, by pressing the mat with a plastic melt, the thickness of the mat is reduced, and it is fixed by the plastic when this has hardened by cooling; when the panel is reheated, to soften it before it is molded, the mat tends to recover its original thickness. This unwanted expansion, which is troublesome, increases as the number and length of the spikes increase.

The aim of the present invention was therefore to avoid these problems and to provide panels that can be easily processed, giving moldings of uniform structure with good mechanical properties and smooth surfaces.

We achieved this aim by the use of symmetrically needled glass-fiber mat. The mat is needled in such a way that at each face of the mat the numbers and lengths of the spikes are practically the same and the average length is preferably less than 4 mm, in particular less than 2 mm.

The needled mat is preferably made from the usual continuous filament or chopped strand, but staple fiber can also be employed. The glass fibers are coated with the usual sizes, which should be suited to the polymers with which the mat is to be impregnated. The fibers are formed into a web, which is then needled in one of several different ways.

In one process the glass mat is first needled from one side, then turned and needled once more from the other side. The second time it can be passed through the same needling machine or go to another machine in series with the first.

In another process needles having both downward-pointing barbs and upward-pointing barbs (reversed barbs) are used.

It is also possible to work with a needle board provided with both needles with downward-pointing barbs and needles with reversed barbs, or with two needle boards, one behind the other, one having the one kind of barbed needles, one the other kind. The fiber ends drawn out of the glass mat by needles with reversed barbs are generally somewhat longer than those thrust out of the glass mat by needles with downward-pointing barbs.

In a preferred embodiment of the invention the glass mat is needled from above and below at the same time by means of a double needling machine. It is then especially advantageous to employ crown needles, which have three downward-pointing barbs on the triangular shaft of the needle at the same distance (3 mm, for instance) above the point.

A common feature of each of the needling methods mentioned is the fact that it is sufficient if the needles penetrate through the mat comparatively slightly. If the needling were from one side only this would not give adequate rupture of the fibers, except on that side; this would lead to uneven strength, and impregnation on the side where the needles emerge would be not so easy as on the side where they go in. These disadvantages do not arise with symmetrical needling: with less intensive and shallower needling it is possible to obtain thin mat of adequate strength that is easy to impregnate and flows out well during molding. Both sides of the mat are uniform and have few, comparatively short spikes that do not interfere with molding.

A criterion for the quality of the needled mat is its breaking strength. The test is carried out with a specimen consisting of a strip about 100 mm wide and about 200 mm long held by grips 100 mm apart whose jaws are about 100 mm wide. The grips are drawn apart and the force at which the strip ruptures is measured. This force should be between 10N/(100 mm) and 50N/(100 mm), preferably between 15N/(100 mm) and 30N/(100 mm).

If the breaking strength is too low there is a danger that the mat will be pulled apart during processing, for example, when it is taken off the roll, and when the mat is impregnated in the double-band press it loses its structure and disintegrates. If the breaking strength is too high the extensibility of the mat may become inadequate when the GMT is molded.

The breaking strength of the mat can be influenced by various factors, such as the number of penetrations per unit area and the depth of penetration; the number and coarseness of the barbs also affect it. The kind of size on the glass also has an effect: if it is brittle more fibers rupture, which reduces the breaking strength.

The novel semifinished material can be manufactured by means of usual impregnation processes. The method of choice is to sandwich two lengths of needled mat between three layers of the hot thermoplastic emerging from slotted extruder dies and to impregnate them by, for instance, lamination in a double-band press as described in DE-A-29 48 235. All the common thermoplastic polymers are suitable, but those preferred are polypropylene, polyamides, thermoplastic polyesters such as poly(ethylene terephthalate), polysulfones, polyether ketones, and mixtures of these. The polymers can contain the usual additives. The mass fraction of glass fibers in the semifinished material should preferably be between 25% and 50%. In general the material is from 2 mm to 5 mm thick.

The novel semifinished material can be press molded by usual methods at temperatures above the softening point of the polymer, yielding moldings for automotive construction, machines, and household goods.

EXAMPLE

A web was formed from glass rovings coated with a size suitable for polypropylene and fed through a needling machine. The width of the web was 1200 mm. The needle board carried 2 rows of close-barb felting needles on the feed side, followed by 14 rows of crown needles and 14 rows of reversed-barb needles. Needling was carried out with 49 penetrations per square centimeter, the needles descending 11 mm. The areal mass of the mat produced was 700 g/m2 and the breaking strength was about 30N/(100 mm). Two lengths of such mat were impregnated by lamination to three lengths of polypropylene at elevated temperature and pressure. The GMT panels obtained were 3.8 mm thick and the mass fraction of glass was 32%.

We claim:

1. Fiber-reinforced thermoformable semifinished material consisting of a thermoplastic polymer and at least one layer of needled glass-fiber mat that has been symmetrically needled.

2. Fiber-reinforced semifinished material as claimed in claim 1 wherein the glass-fiber mat has been needled in such a way that the numbers and lengths of the fiber ends protruding from both sides of the mat are practically the same and the average length of the protruding fiber ends is less than 2 mm.

3. Fiber-reinforced semifinished material as claimed in claim 1 wherein the glass-fiber mat has a breaking strength of from 10N to 50N for a strip 100 mm wide.

4. Fiber-reinforced semifinished material as claimed in claim 1 wherein the glass-fiber mat has an areal mass of from 200 g/m$^2$ to 2500 g/m$^2$.

5. A process for the manufacture of fiber-reinforced semifinished material as claimed in claim 1 wherein the glass-fiber mat is first needled from one side then turned and needled once more from the other side and the mat so needled is impregnated with a thermoplastic polymer.

6. A process for the manufacture of fiber-reinforced semifinished material as claimed in claim 1 wherein the glass-fiber mat is needled by means of needles that have both downward-pointing barbs and upward-pointing (reversed) barbs and the mat so needled is impregnated with a thermoplastic polymer.

7. A process for the manufacture of fiber-reinforced semifinished material as claimed in claim 1 wherein the glass-fiber mat is needled by means of a board carrying both needles with downward-pointing barbs and needles with upward-pointing barbs and the mat so needled is impregnated with a thermoplastic polymer.

8. A process for the manufacture of fiber-reinforced semifinished material as claimed in claim 1 wherein the glass-fiber mat is needled by means of two boards in succession, one carrying needles with downward-pointing barbs and the other needles with upward-pointing barbs, and the mat so needled is impregnated with a thermoplastic polymer.

9. A process for the manufacture of fiber-reinforced semifinished material as claimed in claim 1 wherein the glass-fiber mat is needled from above and below simultaneously by means of a double needling machine and the mat so needled is impregnated with a thermoplastic polymer.

10. A process for the manufacture of semifinished material as claimed in claim 5 or claim 9 wherein needling is carried out with crown needles having three downward-pointing barbs on the triangular shaft of the needle at the same distance above the point.

* * * * *